April 21, 1936.　　　　G. H. STALLMAN　　　　2,038,247
SAUSAGE STUFFING MACHINE
Filed Dec. 26, 1934　　2 Sheets-Sheet 1
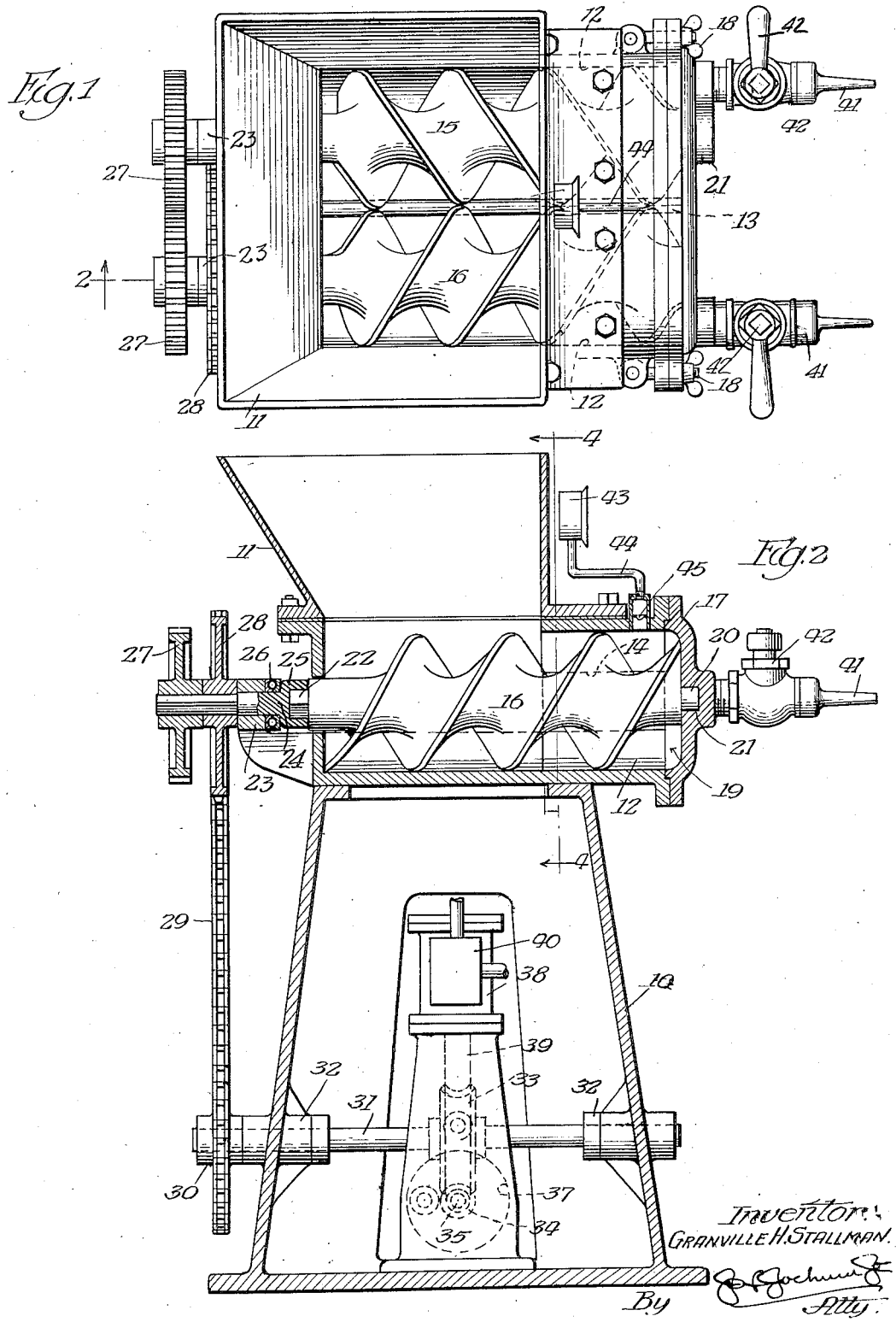

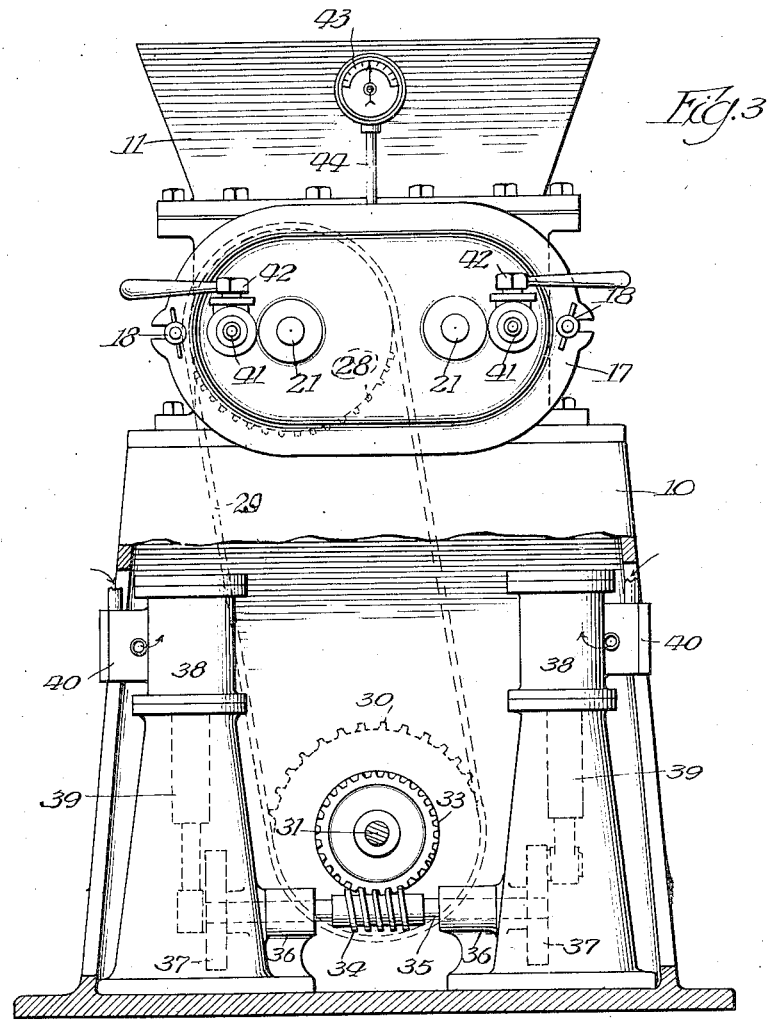
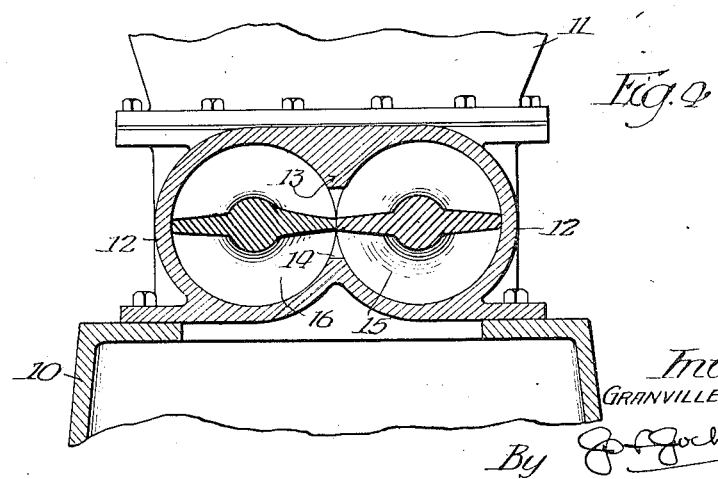

Patented Apr. 21, 1936

2,038,247

UNITED STATES PATENT OFFICE 2,038,247

SAUSAGE STUFFING MACHINE

Granville H. Stallman, Chicago, Ill.

Application December 26, 1934, Serial No. 759,188

8 Claims. (Cl. 17—40)

This invention relates to improvements in sausage stuffing machines employing a plurality of feed screws or worms, working partially within a cylinder, and having a hopper or inlet in connection with the cylinder through which a continuous supply of filling material passes to the feed screws or worms.

The employment of rotating feed screws or worms and a hopper delivering thereto, provides for a continuous supply and feed of material, and the material will be conveyed from the hopper without mixing it in the hopper before introducing it into the cylinders, in which latter the necessary pressure is created upon the material.

The present invention also embodies improved means for maintaining the material from being turned around the cylinders by the feed screws or worms, at the same time the air will be allowed to escape and the material will be confined for a comparatively short distance in the cylinder, that is for a distance only sufficient to provide the necessary pressure.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a top plan view of a machine of this character constructed in accordance with the principles of this invention.

Figure 2 is a vertical sectional view as taken on line 2—2, Figure 1.

Figure 3 is a right hand end elevation of Figure 1.

Figure 4 is a detail sectional view taken on line 4—4, Figure 2, with parts omitted.

Referring more particularly to the drawings, the numeral 10 designates a suitable supporting base, and mounted thereupon is a hopper 11 of any desired size and configuration.

Leading from the hopper adjacent the bottom thereof and projecting in substantially horizontal planes are cylinders 12 of any desired diameter, which are arranged in close proximity to each other and separated by a dividing wall 13.

An opening 14 is provided in the wall 13 to form communication between the cylinders, and this opening may be of any desired height and width and may extend for any desired distance in a direction lengthwise of the axis of the cylinder.

Within the bottom of the hopper two spiral conveyors 15—16 are arranged and the conveyors are of a diameter to substantially fill the respective cylinders 12 and thereby at all times have contact with the cylinder wall.

The conveyors are so positioned that the peripheral edges of the vanes or flights will contact each other lengthwise of the conveyors and also through the opening 14 in the wall 13 between the cylinders, for a purpose to be set forth.

This construction and arrangement results in the formation of perfect pistons and no space will be formed between the pistons and cylinder walls, or between the edges of the flights or vanes, which would permit any of the material to escape, but the material will be forced out of the cylinders by such pistons.

A removable end plate 17 is provided for the cylinders and is secured in position in any suitable manner, such as by means of fastening nuts and bolts 18. The end plate is so shaped as to form a chamber 19 with which the cylinders 12 have communication.

The spiral conveyors 15—16 are removably mounted in any suitable manner, but preferably by providing trunnions 20 on the ends of the conveyors which are rotatable in bearings 21 in the end plate. The other end of each of the conveyors is reduced as at 22, and the reduced portion is angular in cross section, the end of the conveyors passing through suitable openings in the wall of the hopper.

Rotatably mounted in suitable bearings 23 are shafts 24 which are provided with sockets 25 at their inner ends, one of the shafts being provided for each of the worms or screws 15—16. The sockets are angular in cross section and receive the ends 22 of the spiral conveyors so as to connect the shafts 24 with the respective conveyors.

Ball thrust bearings 26 may be provided between the bearings 23 and a portion of the shafts 24 for the ends of the conveyors.

The spirals are connected so as to rotate in unison and in directions towards each other and from the top downwards, preferably by means of gear wheels 27 secured respectively to the shafts 24 and which mesh, and secured also to one of the shafts 24 is a driving gear 28, preferably in the form of a sprocket wheel over which a sprocket chain 29 passes. The sprocket chain also passes over another sprocket wheel 30 secured to a shaft 31 journaled in suitable bearings 32 in the supporting frame 10.

Secured to the shaft 31 for rotation therewith is a worm gear 33 which meshes with a worm 34 secured to a shaft 35. This shaft 35 is journaled in suitable bearings 36 and constitutes the driving shaft, motion being imparted to the shaft 35 in any desired or suitable manner, preferably by means of cranks 37 secured to the shaft and which cranks are rotated by means of pistons (not shown) operating in fluid cylinders 38, and connected to the cranks by pitman rods 39.

Control valves operate in the steam chests 40 and the valves in turn are operated from the shaft 35 in any desired or suitable manner, not shown.

The numeral 41 designates discharge nozzles or spouts which are connected to the end plates 17 of the cylinders and through which the material from the cylinders will be forced so as to be discharged into casings or skins, for the purpose of filling them. A discharge nozzle is arranged adjacent each cylinder and positioned adjacent to the periphery thereof, and each nozzle is adapted to receive and discharge material independent of the other.

Cocks 42 are provided for opening and closing the nozzles to permit or prevent the escape of the material.

A pressure gage 42 has connection with the interior of the cylinders 12 in any suitable manner, preferably by means of a pipe 44, and a suitable control device, such as a diaphragm 45, is so positioned that the pressure created in the cylinders will be manifested upon the diaphragm to cause the actuation of the pressure gage.

With this improved construction it will be manifest that the material will be delivered from the hopper into the cylinders 12 and will be forced through the cylinders by the spiral conveyors and in which cylinder the desired or necessary pressure is created.

As the feed or conveyor spirals rotate in directions towards each other from the top downwardly, and as the material is advanced into the cylinders, portions of the material fed by each spiral will contact through the opening 14 in the wall 13 between the cylinders, with the result that the material will be conveyed by the spirals and the material will be maintained from being turned about the cylinders by the spirals, as it is advanced through the cylinder. The material is discharged into the chamber 17 and from thence through either one or both of the discharge outlets or spouts 41 according to the position of the respective cocks in the spout.

It will be manifest that with this invention it is only necesary to provide a comparatively short cylinder through which the material is forced by the spiral conveyors as the necessary pressure will be built up in the cylinder against the material passing therethrough, by the rotation of the spiral conveyors and by reason of the fact that the material is maintained against being rotated about the cylinders by the spirals.

When it is desired to remove the screws the end plate 17 is detached and the spirals may be then withdrawn through the cylinders.

It will also be manifest that with this invention an improved, compact, simple and sanitary device will be provided.

Obviously, the spirals may be rotated at any desired rate of speed.

While the preferred form of the invention has been herein shown and described, it is to be understood that various changes may be made in the details of construction and in the combination and arrangement of the several parts, without departing from the scope of the claims, without departing from the spirit of this invention.

What is claimed as new is:—

1. A sausage filling machine embodying a hopper, a pair of cylinders communicating with the hopper and having a separating wall therebetween, there being an opening of substantial extent through said wall, a spiral conveyor working in and substantially filling each of the cylinders, the peripheries of the vanes or flights of the conveyors contacting each other through said opening and throughout the length of such opening, said vanes also contacting the cylinder walls, means for rotating said spirals, and a discharge nozzle at the end of each of the cylinders and positioned adjacent to the periphery thereof, each nozzle being adapted to receive and discharge material independent of the other.

2. A sausage filling machine embodying a hopper, a pair of cylinders communicating with the hopper and having a separating wall therebetween, there being an opening of substantial extent through said wall, a spiral conveyor working in and substantially filling each of the cylinders, the peripheries of the flights of the conveyors contacting each other through said opening throughout the length of said opening and also contacting the cylinder walls, means connecting said conveyors for rotation in directions towards each other, actuating means for the conveyors, and a discharge nozzle in the end of each of the cylinders and positioned adjacent to the periphery thereof, each nozzle being adapted to receive and discharge material independent of the other.

3. A sausage filling machine embodying a hopper, two cylinders leading from the hopper and having their sides in abutting relation, a spiral conveyor in each of the cylinders, means connecting the conveyors for rotation towards each other, the edge of the flights or vanes of the conveyors contacting through a complete rotation of the conveyors and also contacting the cylinder walls, and a discharge spout in the end of each of the cylinders and positioned adjacent to the periphery thereof, each nozzle being adapted to receive and discharge material independent of the other.

4. A sausage stuffing machine embodying a hopper, two cylinders leading from the hopper, a conveyor in and substantially filling each of the cylinders and extending into the hopper, said conveyors each comprising a spiral flight extending substantially throughout the length of the respective conveyor, the peripheries of the flights of the conveyors continuously abutting each other in the hopper and also contacting the cylinder walls, means connecting the conveyors for rotation in directions towards each other, a discharge spout in the end of each of the cylinders and positioned adjacent to the periphery thereof, each nozzle being adapted to receive and discharge material independent of the other, and means for maintaining the material against being turned by the conveyors as it is forced through the cylinders.

5. A sausage stuffing machine embodying a hopper, two cylinders leading from the hopper, a conveyor in and substantially filling each of the cylinders and extending into the hopper, said conveyors each comprising spirals forming flights and each extending substantially throughout the length of the respective conveyor, the peripheries of the flights or vanes of the conveyors abutting each other and also abutting the cylinder walls, means connecting the conveyors for rotation in directions towards each other, a discharge spout in the end of each of the cylinders and positioned adjacent to the periphery thereof, each nozzle being adapted to receive and discharge material independent of the other, and means for maintaining the material against being turned by the conveyors as it is forced through the cylinders, the last recited means embodying an opening of substantial length and width in the cylinder walls through which opening the peripheries of the portion of the spirals in the cylinders contact.

6. A sausage stuffing machine embodying a hopper, a pair of cylinders communicating with the hopper, a spiral conveyor rotating in and substantially filling each of the cylinders and projecting into the hopper, the peripheries of the flights of the conveyors continuously contacting each other and also the walls of the cylinders, an end plate for the cylinders shaped to form a chamber with which both of the cylinders have communication, discharge nozzles leading from the chamber and positioned adjacent to the peripheries of the respective cylinders and each nozzle being adapted to receive and discharge material independent of the other, and means for rotating the conveyors.

7. A sausage stuffing machine embodying a hopper, a pair of cylinders communicating with the hopper, a spiral conveyor rotating in and substantially filling each of the cylinders and projecting into the hopper, the peripheries of the flights of the conveyors continuously contacting each other and also the cylinder walls, an end plate for the cylinders shaped to form a chamber with which both of the cylinders have communication, discharge nozzles leading from said chamber and positioned adjacent to the periphery of the respective cylinders and each nozzle being adapted to receive and discharge material independent of the other, means for rotating the conveyors, and means for maintaining the material against being turned by the conveyors, as it is passed through the cylinders, the last said means embodying an opening of substantial width and length forming communication between the cylinders through the side walls thereof and through which opening the peripheries of the conveyor flights or vanes within the cylinders contact.

8. A sausage stuffing machine embodying a hopper, a pair of cylinders communicating with the hopper, a spiral conveyor rotating in and substantially filling each of the cylinders and projecting into the hopper, the peripheries of the vanes or flights of the conveyors continuously contacting each other and also the cylinder walls, and an end plate for the cylinder shaped to form a chamber with which both the cylinders have communication, discharge nozzles leading from said chamber and disposed adjacent to the periphery of the respective cylinders, each nozzle being adapted to receive and discharge material independent of the other, means for rotating the conveyors, and means for detachably securing said end plate in position.

GRANVILLE H. STALLMAN.